(12) United States Patent
Cao et al.

(10) Patent No.: US 10,938,208 B2
(45) Date of Patent: Mar. 2, 2021

(54) MEDIUM-HIGH VOLTAGE PHOTOVOLTAIC POWER GENERATION SYSTEM

(71) Applicant: SUNGROW POWER SUPPLY CO., LTD., Anhui (CN)

(72) Inventors: Renxian Cao, Anhui (CN); Yilei Gu, Anhui (CN); Jun Xu, Anhui (CN); Xinyu Wang, Anhui (CN); Nianan Pan, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 69 days.

(21) Appl. No.: 16/238,985

(22) Filed: Jan. 3, 2019

(65) Prior Publication Data

US 2019/0305552 A1 Oct. 3, 2019

(30) Foreign Application Priority Data

Mar. 28, 2018 (CN) .......................... 201810265673.8

(51) Int. Cl.
*H02J 3/01* (2006.01)
*H02S 40/30* (2014.01)
(Continued)

(52) U.S. Cl.
CPC ................ *H02J 3/01* (2013.01); *H02J 3/385* (2013.01); *H02M 7/49* (2013.01); *H02M 7/5387* (2013.01);
(Continued)

(58) Field of Classification Search
CPC .... H02J 3/01; H02J 3/385; H02J 3/387; H02J 3/383; H02J 3/386; H02J 3/00; H02J 3/38;
(Continued)

(56) References Cited

U.S. PATENT DOCUMENTS 6,300,555 B1 10/2001 Kondo et al.
8,901,773 B2 12/2014 Lauinger et al.
(Continued)

FOREIGN PATENT DOCUMENTS

CN 101917016 A 12/2010
CN 103326622 A 9/2013
(Continued)

OTHER PUBLICATIONS

European Search Report regarding Application No. 18214833.8 dated Jul. 4, 2019.
(Continued)

*Primary Examiner* — Rexford N Barnie
*Assistant Examiner* — Jagdeep S Dhillon
(74) *Attorney, Agent, or Firm* — Harness, Dickey & Pierce, P.L.C.

(57) ABSTRACT

A medium-high voltage photovoltaic (PV) power generation system is provided. A PV string of the system is insulated from the ground via an insulator of a medium-high voltage withstanding level, so that the PV string is applicable under a high voltage level. The PV strings are connected to cascade modules. An output voltage of series-connected cascade modules is grid-connected to a 10 kV power grid through a three-phase filter, without a power booster transformer or a high-frequency isolated DC/DC converter in a conventional power station, thereby improving the system efficiency.

11 Claims, 11 Drawing Sheets

(51) Int. Cl.
  *H02S 40/32* (2014.01)
  *H02S 40/34* (2014.01)
  *H02S 40/36* (2014.01)
  *H02J 3/38* (2006.01)
  *H02M 7/5387* (2007.01)
  *H02M 7/49* (2007.01)
  *H02M 1/00* (2006.01)

(52) U.S. Cl.
  CPC .............. *H02S 40/30* (2014.12); *H02S 40/32* (2014.12); *H02S 40/34* (2014.12); *H02S 40/36* (2014.12); *H02J 3/383* (2013.01); *H02M 2001/0077* (2013.01); *Y02E 10/56* (2013.01)

(58) Field of Classification Search
  CPC .. H02J 3/24; H02S 40/34; H02S 40/32; H02S 40/30; H02S 40/36; H02M 7/5387; H02M 7/00; H02M 7/483; H02M 7/537; H02M 7/539; H02M 2001/0048; H02M 5/458; H02M 5/4585; H02M 1/126
  USPC ................ 307/78, 77, 76, 81, 109, 112, 116
  See application file for complete search history.

(56) References Cited

U.S. PATENT DOCUMENTS

| | | | |
|---|---|---|---|
| 9,960,709 B2 | 5/2018 | Mukunoki et al. | |
| 10,115,841 B2* | 10/2018 | Adest | H01L 31/04 |
| 10,141,865 B1* | 11/2018 | Noman | H02M 7/483 |
| 2008/0238195 A1* | 10/2008 | Shaver | H02J 3/38 307/18 |
| 2009/0101191 A1* | 4/2009 | Beck | H01L 31/02021 136/244 |
| 2010/0139743 A1* | 6/2010 | Hadar | H05F 3/02 136/251 |
| 2011/0031813 A1* | 2/2011 | Falk | H02J 3/383 307/77 |
| 2011/0221274 A1* | 9/2011 | Eaglesham | H01L 31/02021 307/43 |
| 2011/0266876 A1 | 11/2011 | Lauinger et al. | |
| 2012/0103399 A1 | 5/2012 | Lauinger | |
| 2013/0242628 A1 | 9/2013 | Fukatsu et al. | |
| 2016/0254672 A1* | 9/2016 | Yoscovich | H02J 3/385 307/77 |
| 2016/0254783 A1* | 9/2016 | Unru | G01R 31/64 324/658 |
| 2016/0261205 A1* | 9/2016 | Kolar | H02M 1/32 |
| 2017/0201189 A1* | 7/2017 | Li | H02M 7/487 |
| 2017/0229871 A1* | 8/2017 | Liu | H02J 3/383 |
| 2017/0271974 A1* | 9/2017 | Koivula | H02J 3/381 |
| 2018/0069488 A1 | 3/2018 | Mukunoki et al. | |
| 2019/0229646 A1* | 7/2019 | Liu | H02M 7/5395 |
| 2019/0341862 A1* | 11/2019 | Vasiladiotis | H02M 7/483 |

FOREIGN PATENT DOCUMENTS

| | | |
|---|---|---|
| CN | 205901296 U | 1/2017 |
| CN | 107612405 A | 1/2018 |
| CN | 107834602 A | 3/2018 |
| EP | 2670016 A2 | 12/2013 |
| JP | H05167095 A | 7/1993 |
| JP | H11103086 A | 4/1999 |
| JP | 2011021468 A | 2/2011 |
| JP | 2012515519 A | 7/2012 |
| JP | 2013192382 A | 9/2013 |
| WO | WO-2005117136 A2 | 12/2005 |
| WO | WO-2016147935 A1 | 9/2016 |

OTHER PUBLICATIONS

First Chinese Office Action regarding Application No. 201810265673.8 dated Aug. 30, 2019.

First Japanese Office Action regarding Application No. 2018-239129 dated Feb. 17, 2020. English translation provided by Unitalen Attorneys at Law.

\* cited by examiner

MEDIUM-HIGH VOLTAGE PHOTOVOLTAIC POWER GENERATION SYSTEM

The present application claims priority to Chinese Patent Application No. 201810265673.8, titled "MEDIUM-HIGH VOLTAGE PHOTOVOLTAIC POWER GENERATION SYSTEM", filed on Mar. 28, 2018 with the Chinese Patent Office, which is incorporated herein by reference in its entirety.

FIELD

The present disclosure relates to the technical field of photovoltaic (PV) power generation, in particular to a medium-high voltage PV power generation system.

BACKGROUND

At present, in the field of photovoltaic (PV) power generation, twenty two low-voltage PV panels (for a 1000V system) or thirty four low-voltage PV panels (for a 1500V system) are generally connected in series, then the series-connected PV panels is connected with a grid-connected inverter. An alternating current voltage of several hundreds of volts (for example, 315V, 360V, 400V, etc.) is generated by the grid-connected inverter, then the alternating current voltage is grid-connected to a medium-high voltage power grid of a 10 kV level, a 35 kV level or a 110 kV level through a power booster transformer.

However, in the presence of the power booster transformer, the system may be bulky, and it is difficult to further improve the efficiency of the system under a two-stage transformation of the grid-connected inverter and the power booster transformer, resulting in a maximum efficiency of less than 98% in the system.

In addition, in the conventional art, there is also a two-stage transformation solution in which a high-frequency isolated direct current/direct current (DC/DC) converter and an inverter is used. However, it is difficult to achieve a high efficiency of the high-frequency isolated DC/DC converter due to a wide range of the gain of the input and output voltages required by the high-frequency isolated DC/DC converter, thus a system according to the two-stage transformation solution has an efficiency lower than or equal to that of a system according to the conventional solution.

SUMMARY

A medium-high voltage photovoltaic (PV) power generation system is provided according to the present disclosure to solve the problem of a low efficiency of a system according to the conventional art.

The following technical solutions are provided according to the present disclosure.

A medium-high voltage PV power generation system is provided, which includes a three-phase filter and three phase circuits connected in a star manner or a delta manner via the three-phase filter. Each of the phase circuits includes one bridge arm or two bridge arms connected in series. The bridge arm includes one or more cascade modules, one or more PV strings and one or more insulators. The PV string includes multiple PV panels. In the bridge arm, alternating ends of the cascade modules are cascaded to form a branch, and two ends of the branch serve as output ends of the bridge arm. A direct current end of the cascade module is connected to at least one of the PV strings. The PV string is insulated from a ground via the insulator. A height from the PV panel to the ground is greater than a preset height. The insulator is of a medium-high voltage withstanding level.

In an embodiment, at least two PV panels of the PV string are insulated from the ground via one insulator. Alternatively, each of the PV panels of the PV string is insulated from the ground via one or more insulators corresponding to the PV panel.

In an embodiment, in a case that at least two PV panels of the PV string are insulated from the ground via one insulator, the bridge arm further includes at least one bracket. The bracket is arranged between the PV panels and the insulator, or between the insulator and the ground.

In an embodiment, the cascade module is configured to perform a maximum power point tracking (MPPT) control.

In an embodiment, the bridge arm further includes multiple combiner boxes. The direct current end of the cascade module is connected to an output end of at least one combiner box, and an input end of the combiner box is connected to at least one PV string.

In an embodiment, the bridge arm further includes multiple insulators. The insulator is configured to insulate at least one of the combiner boxes connected to the insulator from the ground.

In an embodiment, the bridge arm further includes a lightning protection line arranged around the PV panel, and the lightning protection line is provided with at least one grounding point.

In an embodiment, the PV string includes multiple substrings connected in series, and adjacent substrings are connected via a switch. The substring includes multiple PV panels.

In an embodiment, in a case that the phase circuit includes one bridge arm, the output end of the bridge arm serves as an output end of the phase circuit, and is connected to the three-phase filter. In a case that the phase circuit includes two bridge arms connected in series, the two bridge arms serve as an upper bridge arm and a lower bridge arm of the phase circuit respectively. The upper bridge arm and the lower bridge arm are connected via two first inductors, a connection point of the two first inductors serves as an output end of the phase circuit, and is connected to the three-phase filter. Alternatively, the upper bridge arm and the lower bridge arm are connected via a second inductor with a center tap, the center tap of the second inductor serves as an output end of the phase circuit and is connected to the three-phase filter.

In an embodiment, in a case that the phase circuit includes one bridge arm, a main circuit of the cascade module has an H bridge topology or an H bridge topology with a non-isolated DC/DC converter. In a case that the phase circuit comprises two bridge arms connected in series, the main circuit of the cascade module has any one of an H bridge topology, an H bridge topology with a non-isolated DC/DC converter, a half bridge topology and a half bridge topology with a non-isolated DC/DC converter.

In the medium-high voltage PV power generation system according to the present disclosure, an insulator of a medium-high voltage withstanding level is used to insulate the PV string from the ground, so that the PV string is applicable under a high voltage level. The PV strings are connected to the cascade modules. The voltage generated by series-connected cascade modules is grid-connected to a 10 kV power grid through a three-phase filter, without a power booster transformer or a high-frequency isolated DC/DC converter in a conventional power station, thereby improving the system efficiency compared with the conventional art.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

The technical solutions according to the embodiments of the present application are described clearly and completely as follows in conjunction with the drawings. It is apparent that the described embodiments are only a few rather than all of the embodiments according to the present application. Any other embodiments obtained by those skilled in the art based on the embodiments in the present disclosure without any creative efforts fall within the protection scope of the present application.

A medium-high voltage photovoltaic (PV) power generation system is provided according to the present disclosure to solve a problem of a low efficiency of a system in the conventional art.

Figure 1A:
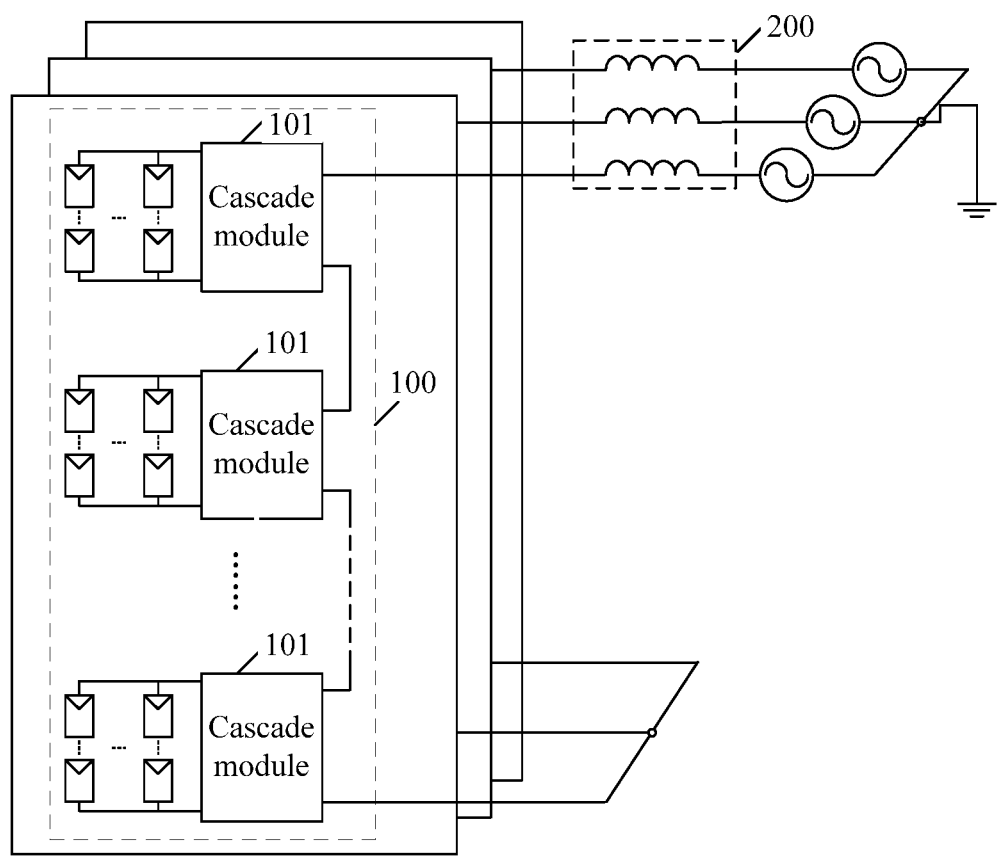
FIGS. 1a to 2b are four schematic structural diagrams of a main circuit of a medium-high voltage photovoltaic (PV) power generation system according to an embodiment of the present disclosure.
Figure 1B:
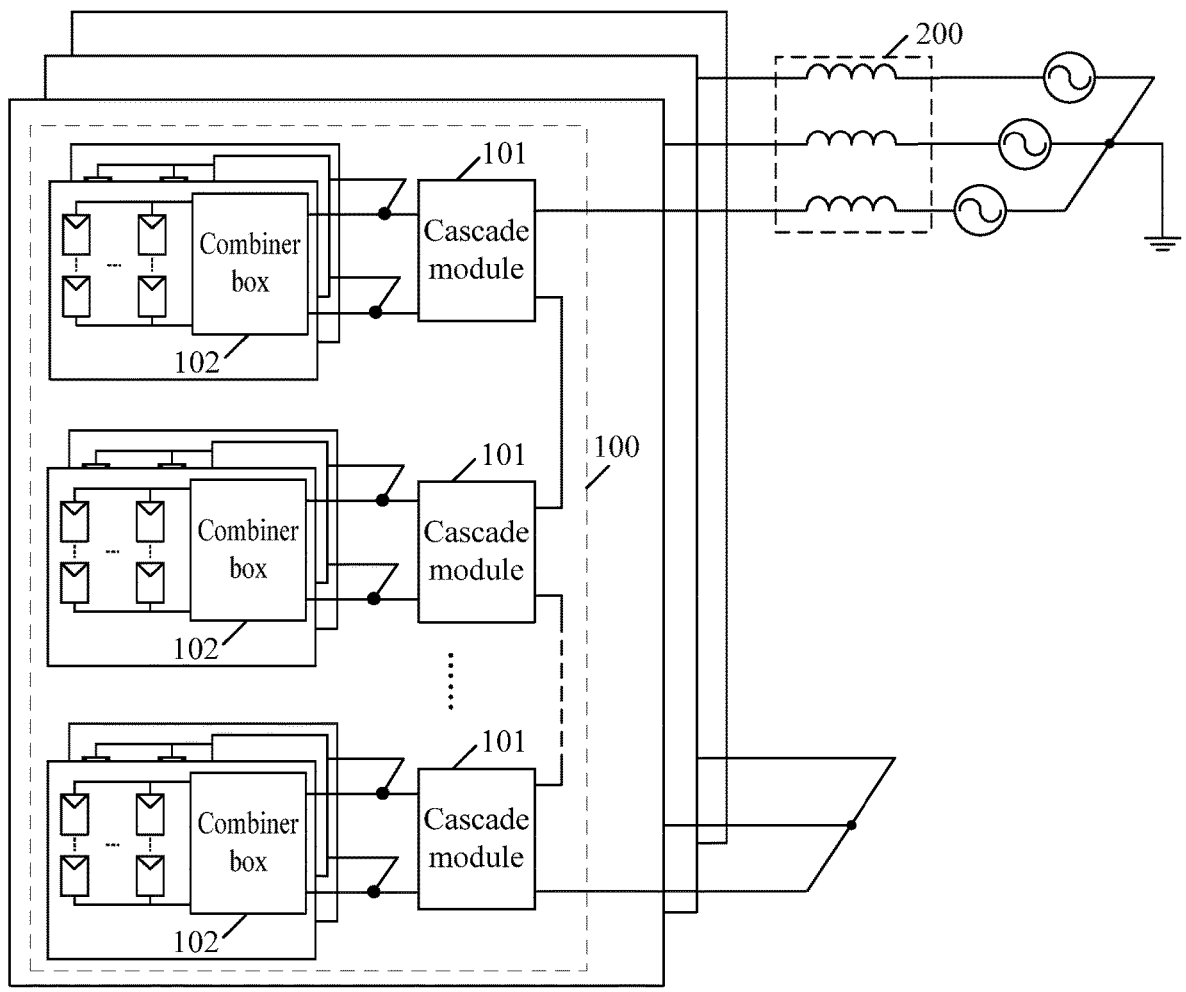
Figure 2A:
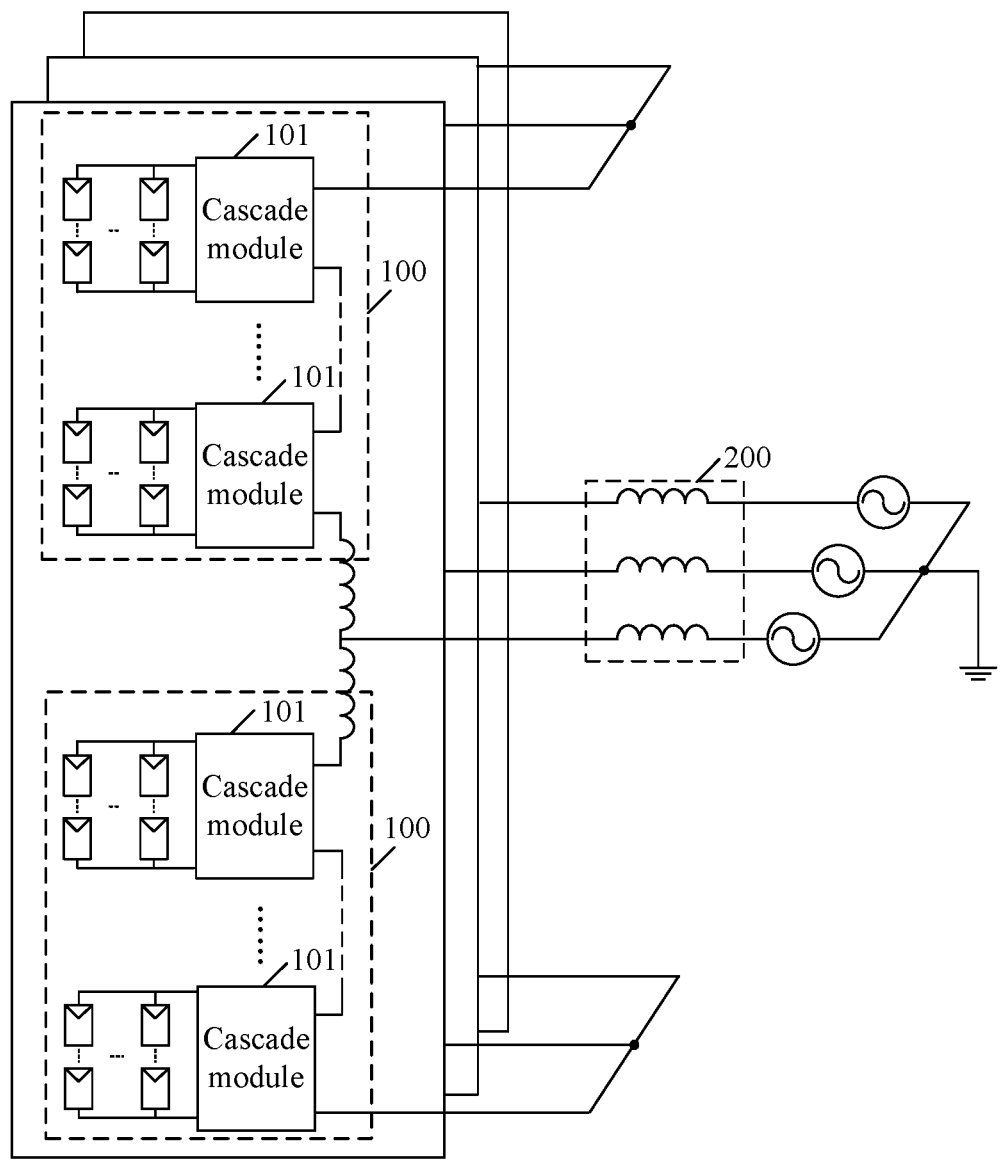
Figure 2B:
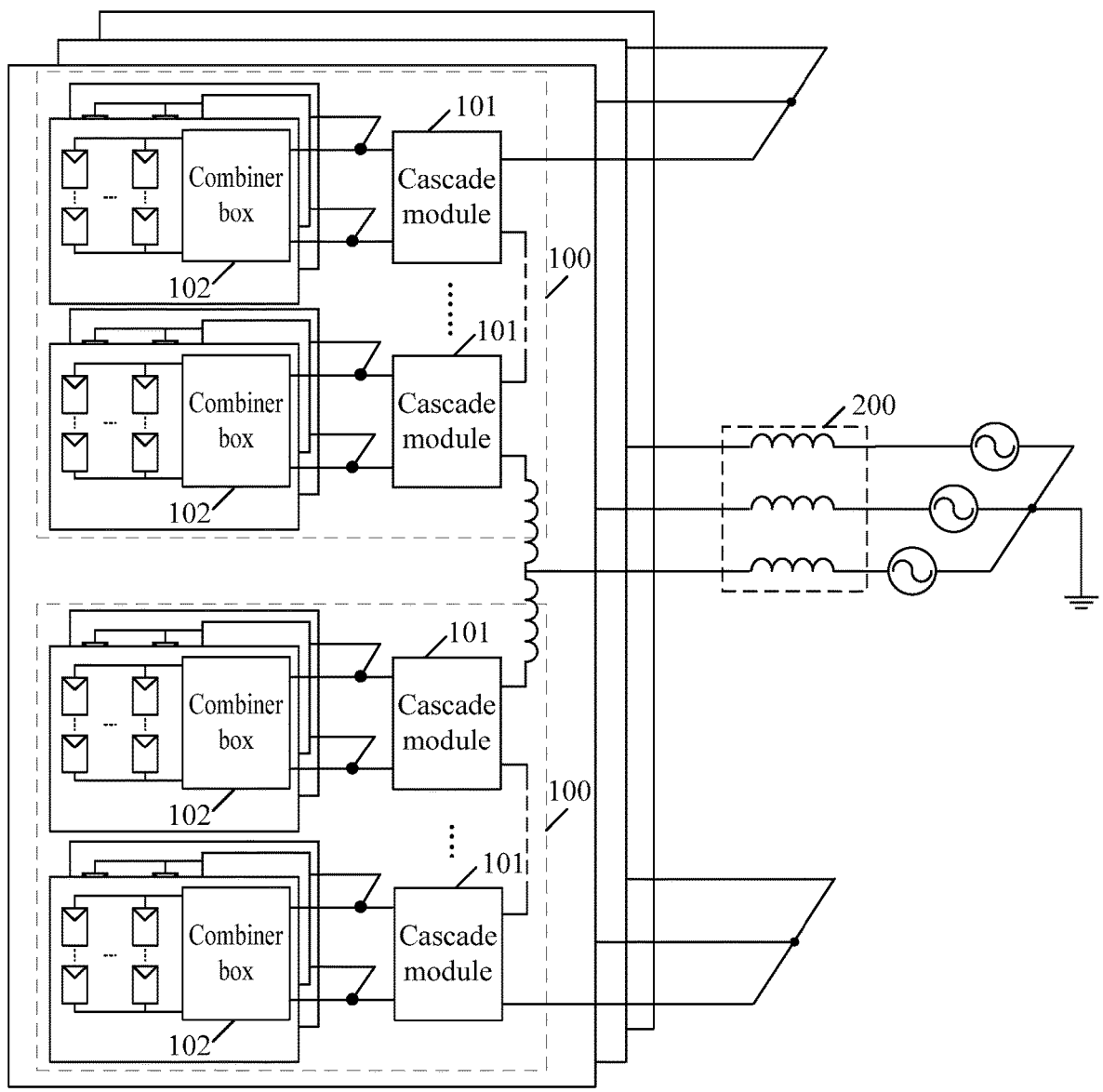

Referring to FIGS. 1a to 2b, a medium-high voltage PV power generation system includes a three-phase filter 200 and three phase circuits connected in a star manner or a delta manner via the three-phase filter 200. The phase circuit includes one bridge arm 100 (as shown in FIG. 1a and FIG. 1b), or the phase circuit includes two bridge arms 100 connected in series (as shown in FIG. 2a and FIG. 2b). The bridge arm 100 includes one or more cascade modules 101, one or more PV strings and one or more insulators. The PV string includes multiple PV panels connected in series, in parallel or in a combination manner thereof. In the bridge arm 100, alternating current ends of the cascade modules 100 are cascaded via high voltage cables to form a branch, and two ends of the branch serve as output ends of the bridge arm 100. A direct current end of the cascade module 100 is connected to at least one of the PV strings, as shown in FIG. 1a and FIG. 2a. The PV string is insulated from the ground via the insulator. A height from the PV panel to the ground is greater than a preset height. The insulator is of a medium-high voltage withstanding level, which is, in particular, up to a 10 kV level or higher.

In an embodiment, referring to FIG. 1b and FIG. 2b, the bridge arm 100 further includes multiple combiner boxes 102. The direct current end of the cascade module 101 is connected to an output end of at least one combiner box 102, and an input end of the combiner box 102 is connected to at least one PV string.

In an embodiment, the bridge arm 100 further includes multiple insulators. The insulator is configured to insulate the combiner box 102 connected to the insulator from the ground.

As shown in FIG. 1a and FIG. 1b, in a case that the phase circuit includes one bridge arm 100, an output end of the bridge arm 100 serves as an output end of the phase circuit and is connected to the three-phase filter 200. The phase circuits may be connected to the power grid in a star manner via the three-phase filter 200 (as shown in FIG. 1a and FIG. 1b), or the phase circuits may also be connected to the power grid in a delta manner via the three-phase filter 200 (not shown in the figures), which is not limited herein. The connection manner may be determined according to actual needs, which should fall within the protection scope of the present disclosure.

As shown in FIG. 2a and FIG. 2b, in a case that the phase circuit includes two bridge arms 100 connected in series, the two bridge arms 100 respectively serve as an upper bridge arm and a lower bridge arm of the phase circuit. The upper bridge arm and the lower bridge arm are connected via two first inductors, and a connection point of the two first inductors serves as an output end of the phase circuit and is connected to the three-phase filter 200. Alternatively, the upper bridge arm and the lower bridge arm are connected via a second inductor with a center tap, the center tap of the second inductor serves as an output end of the phase circuit and is connected to the three-phase filter 200. The phase circuits may be connected to the power grid in a star manner via the three-phase filter 200 (as shown in FIG. 1a and FIG. 1b), or the phase circuits may also be connected to the power grid in a delta manner through the three-phase filter 200 (not shown in the figures), which is not limited herein. The connection manner may be determined according to actual needs, which should fall within the protection scope of the present disclosure.

Figure 3A:
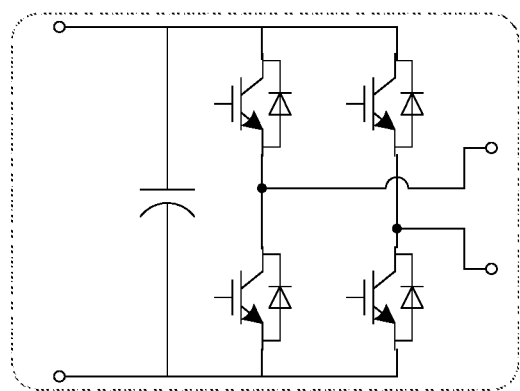
FIGS. 3a to 4b are four schematic circuit diagrams of a main circuit of a cascade model according to an embodiment of the present disclosure.
Figure 3B:
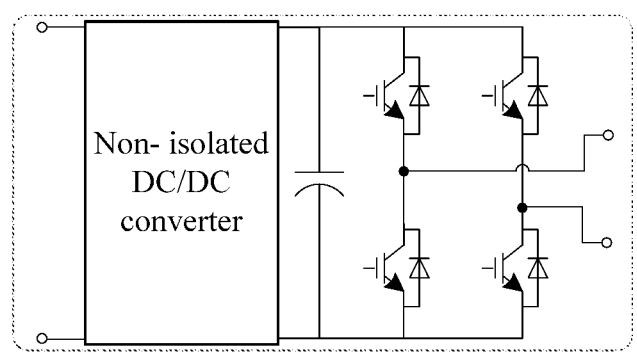
Figure 4A:
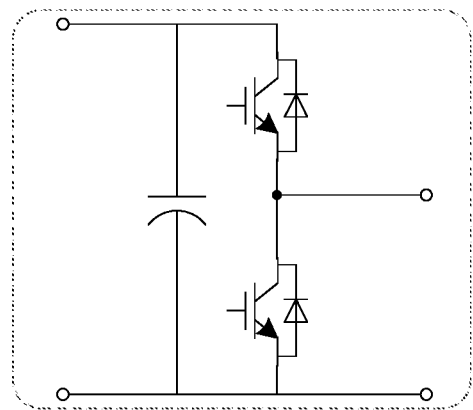
Figure 4B:
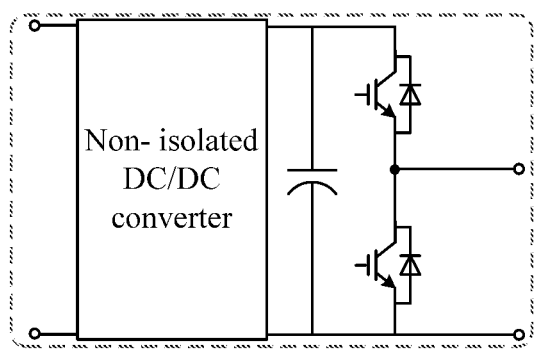

In addition, in a case that the phase circuit includes one bridge arm 100, a main circuit of the cascade module 101 has an H bridge topology (as shown in FIG. 3a) or an H bridge topology with a non-isolated DC/DC converter (as shown in FIG. 3b). In a case that the phase circuit includes two bridge arms 100 connected in series, the main circuit of the cascade module 101 has any one of an H bridge topology (as shown in FIG. 3a), an H bridge topology with a non-isolated DC/DC converter (as shown in FIG. 3b), a half bridge topology (as shown in FIG. 4a) and a half bridge topology with a non-isolated DC/DC converter (as shown in FIG. 4b), which is not limited herein. The circuit structure may be determined according to actual needs, which should fall within the protection scope of the present disclosure.

In practice, all cascade modules 101 may be located in one device. The three-phase filter 200 includes, but is not limited to, an L filter, an LC filter, an LCL filter, a high order filter, which may be determined according to actual needs, and should fall within the protection scope of the present disclosure.

The application levels of PV panels are defined in the IEC61730-2 standard. Level A indicates that the PV panel is applicable in a condition of a public accessible environment, a high voltage and a high power. The PV panel applicable under level A may be applied in a public accessible system with a direct current voltage of more than 50V or a direct current power of more than 240 W. Level B indicates that the PV panel is applicable in a condition of a public limited environment, a high voltage and a high power. The PV panel identified applicable in level B may be applied in a public limited system isolated via an enclosure, a specific zone or other measures. The PV panel in a conventional PV power generation system is applied under level A, where a 1000V system and a 1500V system are respectively apply maximum system voltages of 1000V and 1500V, to ensure safety of workers during installing or maintaining PV panels at a PV power station, and prevent other unrelated person and animals from being electrically shocked when entering the power station. For some stations isolated from person and animals, a larger number of PV panels may be connected in series to increase the maximum voltage of the system, in this case, PV panels are applied under the level B.

Therefore, in the embodiment, an insulator of a high voltage level is used to insulate the PV string from the ground. In practice, the insulator may withstand a voltage of more than 10 kV, such that the PV panel may withstand a voltage of more than 10 kV with respect to the ground. In this case, a low voltage PV panel may be applicable under a high voltage level. For example, the low voltage PV panel is supplied with a voltage of 18 kV, and is connected to a high voltage PV inverter, the PV inverter may be directly connected to a power grid of a 10 kV level without a power booster transformer or a high-frequency isolated DC/DC converter in the conventional power station, such that the maximum efficiency of the system is improved from 98% to 99%. That is, compared with a conventional system, in the embodiment, the efficiency of the system is improved, and the system is combined favorably with alternating current transmission and distribution architecture of the conventional system.

It is to be noted that, the power booster transformer in the conventional art has a high no-load loss at night. Moreover, in a case of using the power booster transformer, the inverter performs control to output a grid-connected current with a unity power factor. The grid-connected current generally refers to a current outputted by a filter of the inverter, that is, a current at a low voltage side of the power booster transformer. However, a current at a high voltage side of the power booster transformer does not have a unity power factor due to an impedance of a connection cable between the inverter and the power booster transformer, leakage inductance and magnetizing inductance at a primary side and a secondary side of the power booster transformer. In addition, in a case that the inverter is operated in a reactive power compensation mode at night, a power factor of an output current of the power booster transformer is not changed accurately in response to an instruction.

With the medium-high voltage PV power generation system in the embodiment, the power booster transformer is eliminated, which indicates that there is no no-load loss of the power booster transformer at night, and the problem that the power factor at the low voltage side of the transformer is inconsistent with the grid-connected power factor in the power grid is solved. Moreover, since the PV panel is insulated from the ground via the insulator, a leakage current of the PV panel is reduced, thereby slowing down the degradation of the PV panel, thus increasing power generation amount of a PV power station throughout a life cycle and reducing a maintenance cost. In addition, a high cost in the conventional art caused by using the high frequency isolated DC/DC converter is also avoided. The medium-high voltage PV power generation system is applicable particularly in areas with no people or few people, such as deserts and wastelands, where the power generation station may be managed in a closed-off manner.

In an embodiment, the cascade module 101 is configured to perform maximum power point tracking (MPPT) control.

In this embodiment, each cascade module 101 may perform MPPT control independently. In a case that a system has N cascade modules 101, the system may perform MPPT control via N independent paths. Compared with the conventional art in which the MPPT control is performed by a PV array, in the embodiment according the present disclosure, even if a PV panel connected to the cascade module 101 is shadowed or damaged, the PV panels connected to other cascade modules 101 are not affected and may also perform the MPPT control, such that the power generation amount of the system is maximized.

Figure 5A:
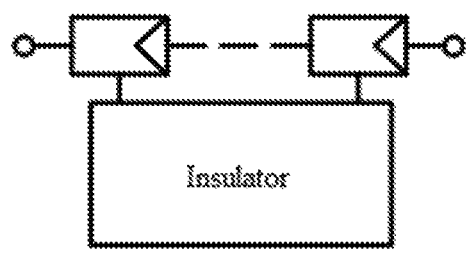
FIGS. 5a to 9c are fourteen schematic structural diagrams of a PV string according to an embodiment of the present disclosure.
Figure 5B:
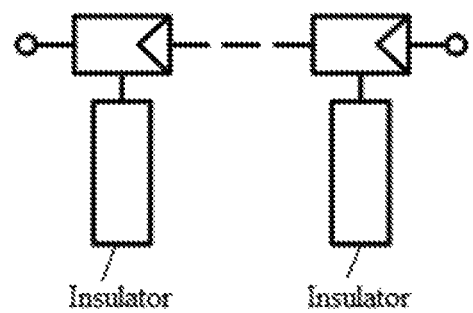

The arrangements of the insulators are provided according to another embodiment of the present disclosure based on the above embodiment and referring to FIG. 1a to FIG. 4b. The insulators may be arranged in the following manners:

at least two PV panels of the PV string are insulated from the ground via one insulator (as shown in FIG. 5a), or each of the PV panels of the PV string is insulated from the ground via one or more insulators corresponding to the PV panel (as shown in FIG. 5b).

In an embodiment, the bridge arm of the medium-high voltage PV power generation system further includes at least one bracket. The bracket is arranged between one or more PV panels and the insulator. Alternatively, the bracket is arranged between one or more insulators and the ground.

Figure 6A:
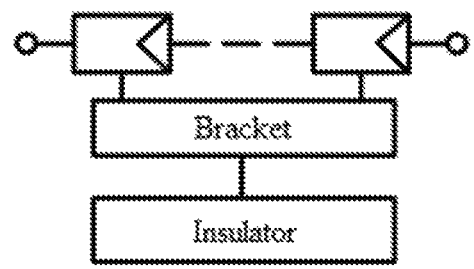
Figure 6B:
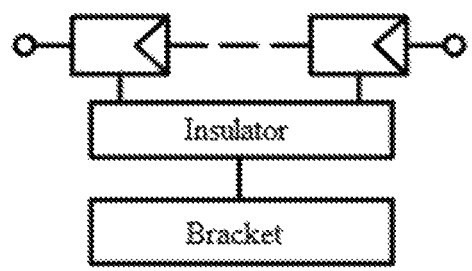
Figure 6C:
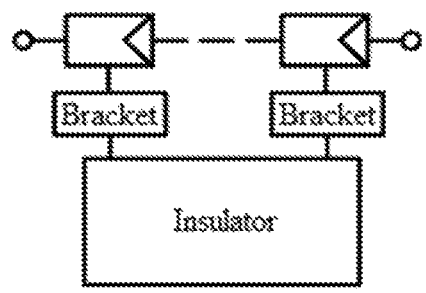

Specifically, in a case that at least two PV panels of the PV string are insulated from the ground via one insulator, the bridge arm 100 may include any number of brackets. For example, in a case that the bridge arm 100 includes one bracket, the bracket is arranged between the PV panels and the insulator (as shown in FIG. 6a), or the bracket is arranged between the insulator and the ground (as shown in FIG. 6b). In a case that the bridge arm 100 includes two or more brackets, the brackets are arranged between the insulator and the PV panels (as shown in FIG. 6c), or between the insulators and the ground (not shown).

Figure 7A:
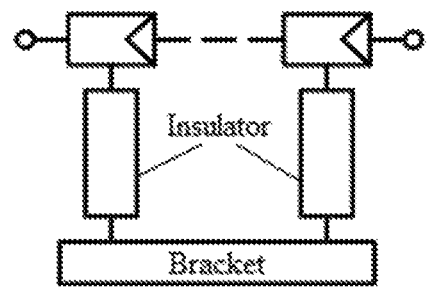
Figure 7B:
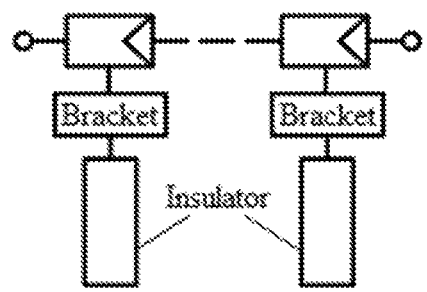
Figure 7C:
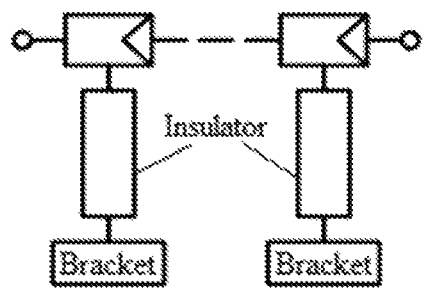

Moreover, in a case that each of the PV panels of the PV string is insulated from the ground via one or more corresponding insulators, the bridge arm 100 may include any number of brackets. For example, in a case that the bridge arm 100 includes one bracket, the bracket is arranged between the insulators and the ground (as shown in FIG. 7a), or the bracket is arranged between the PV panels and the insulators (not shown). In a case that the bridge arm 100 includes more than one bracket, each bracket may be arranged between a corresponding PV panel and a corresponding insulator (as shown in FIG. 7b), or each bracket may be arranged between a corresponding insulator and the ground (as shown in FIG. 7c).

FIGS. 5a to 7c shows connections between the insulator and the PV string, but the present disclosure is not limited thereto. In addition, there is no correspondence among the numbers of the PV panels, the brackets and the insulators. The connection among the PV panel, the bracket and the insulator may be determined according to actual needs, which are all within the protection scope of the present disclosure.

Other principle of the solution is the same as that described in the above embodiments, and is not described in detail herein.

In a case that the PV panel is elevated by the insulator and insulated from the ground, it is a difficult issue to protect a PV panel from lightning stroke. If there is no sufficient lightning protection measure, a large number of PV panels may be damaged, resulting in huge economic losses and consuming additional manpower and resources.

Therefore, a medium-high voltage PV power generation system is provided according to another embodiment of the present disclosure. In an embodiment, based on the above embodiment and referring to FIG. 1a to FIG. 7c, the bridge arm 100 further includes a lightning protection line arranged around the PV panels, and the lightning protection line is arranged with at least one grounding point.

The lightning protection line is grounded via the bracket of the PV panel or another device, and the number of grounding points is greater than or equal to one. The lightning protection line is located around the PV panels or the PV string, which includes, but is not limited to, above the PV panels or the PV string and at a side of the PV panels or the PV string, as shown in FIG. 8a, FIG. 8b and FIG. 8c.

According to the embodiment, in a case that the PV panel is elevated, the problem of protecting the PV panel from lightning stroke is solved, such that the safety, reliability and maintenance-free performance of the system can be improved greatly.

Figure 8A:
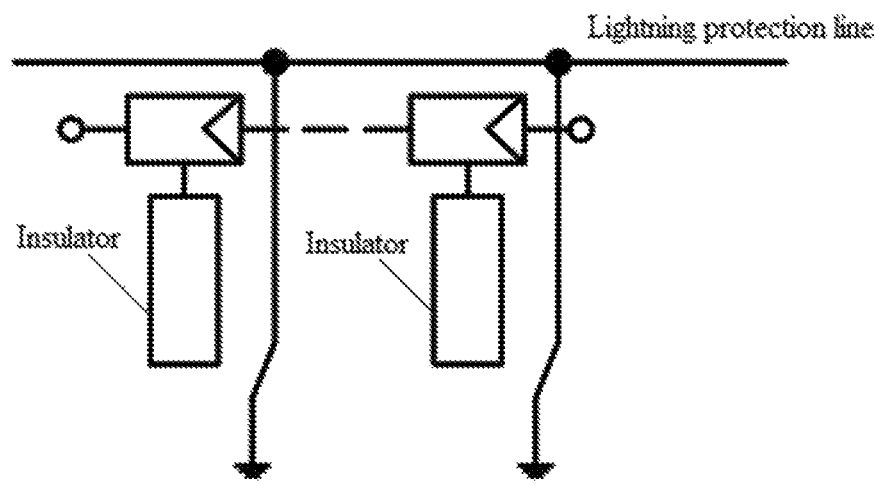
Figure 8B:
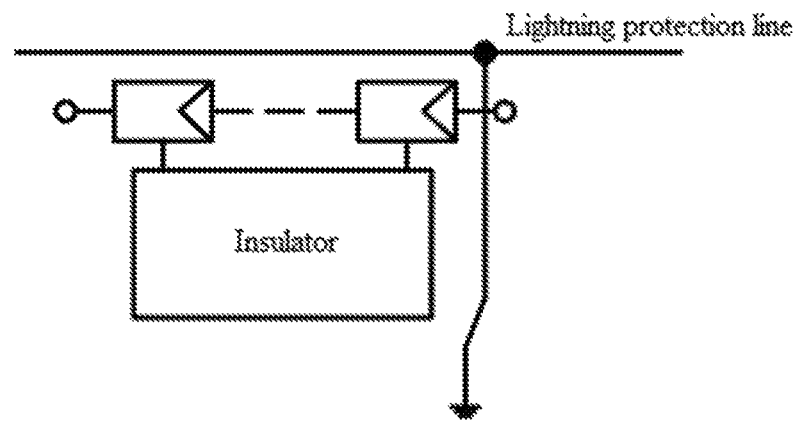
Figure 8C:
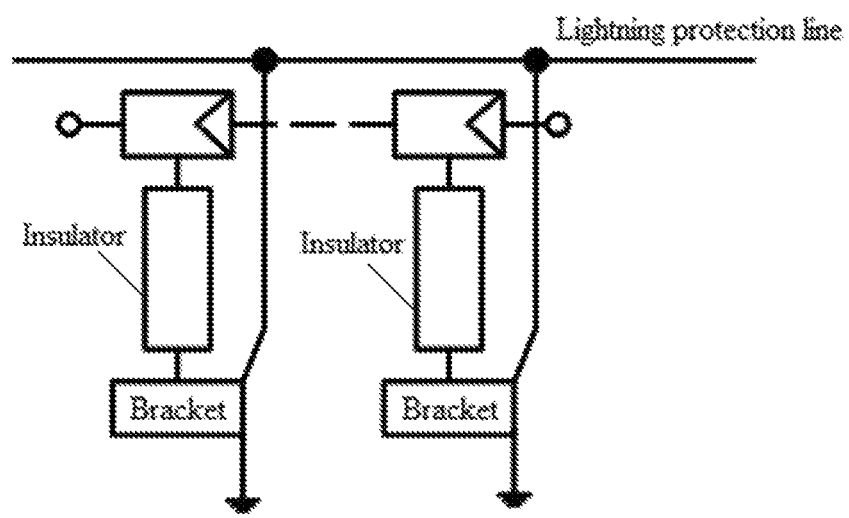

It is to be noted that, FIG. 8a, FIG. 8b and FIG. 8c only show a few examples, the insulator may be arranged referring to FIG. 6a to FIG. 7b, which are not described in detail herein and are all within the protection scope of the present disclosure.

Other principle of the solution is the same as that described in the above embodiments, which is not described in detail herein.

In a case that the PV panel is elevated by the insulator and insulated from the ground, the PV string formed by connecting a large number of PV panels in series is operated under a high voltage level, thus the workers can not perform installation and maintenance on the PV string directly.

Figure 9A:
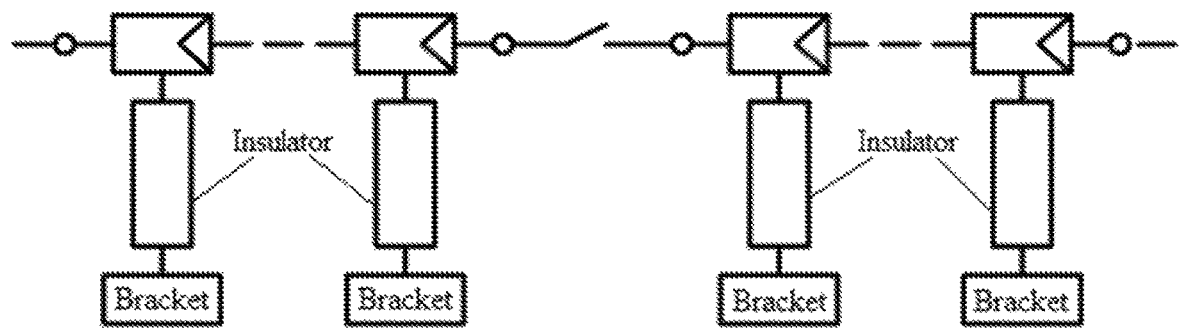
Figure 9B:
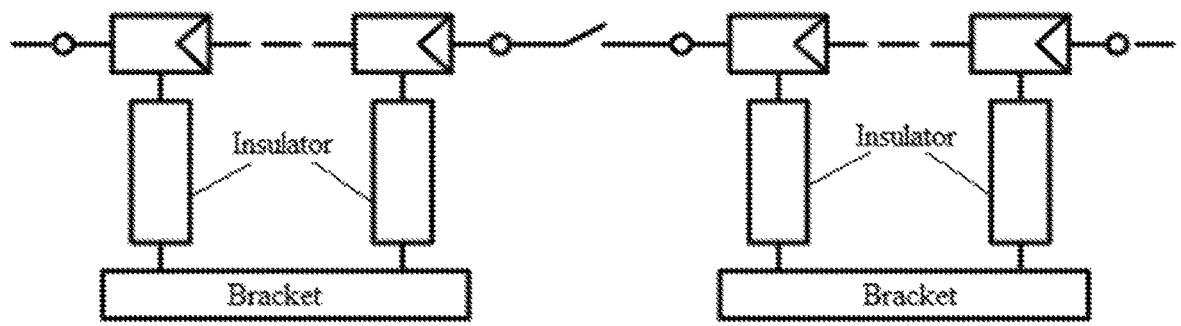
Figure 9C:
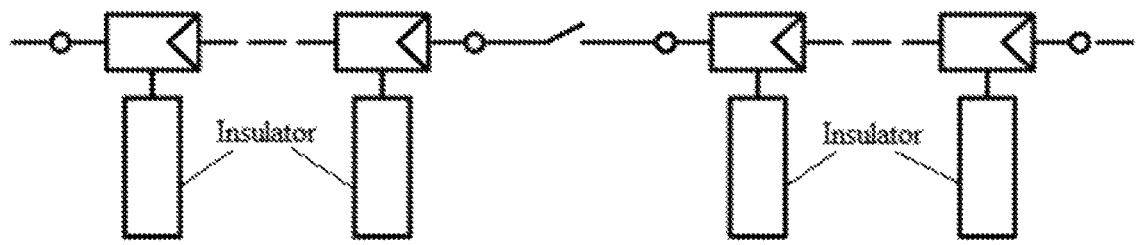

Therefore, a medium-high voltage PV power generation system is provided according to another embodiment of the present disclosure. In an embodiment, based on the above embodiment and referring to FIG. 1a to FIG. 8c, the PV string includes multiple substrings connected in series, and adjacent substrings are connected via a switch. The substring includes multiple PV panels connected in series, in parallel, or in a combination manner thereof, as shown in FIG. 9a to FIG. 9c.

In a case that the system is initially constructed, all the substrings are installed firstly, and the switches are respectively arranged between adjacent substrings, after that, the switches are turned on.

In a case that the PV panel is to be maintained, the switches on both sides of the substring where the PV panel to be maintained is located are turned off, then the PV panel is maintained.

According to the embodiment, the PV string may be divided into substrings based on voltage levels through the above method, and the voltage level of each substring is lower, which is convenient for the worker to perform installation and maintenance. With this method, the maintainability on a PV string with a high voltage level is greatly improved.

It is to be noted that, FIG. 9a, FIG. 9b and FIG. 9c only show some examples, and the substring may be connected with the insulator in a manner referring to FIG. 5a, FIG. 6a to FIG. 6c and FIG. 7b, which are not described in detail herein and should fall within the protection scope of the present disclosure.

Other principle of the solution is the same as that described in the above embodiments, and is not described in detail herein.

Various embodiments of the present disclosure are described in a progressive manner, and each embodiment lays emphasis on differences from other embodiments. For the same or similar parts between the embodiments, one may refer to description of other embodiments. The device disclosed in the embodiments corresponds to the method disclosed in the embodiments, and is described relatively simply. For detailed description of the device, reference may be made to the related description of the method.

The above description shows merely preferred embodiments of the present disclosure and does not limit the present disclosure in any form. Although the present disclosure is disclosed with the above preferred embodiments, the above preferred embodiments are not intended to limit the present disclosure. Numerous alternations, modifications and equivalents can be made to the technical solutions of the present disclosure by those skilled in the art in light of the methods and technical contents disclosed herein without departing from the scope of the present disclosure. Therefore, any simple changes, equivalent variations and modifications on the above embodiments made according to the technical essence of the present disclosure without departing the content of the technical solutions of the present disclosure fall within the protection scope of the technical solutions of the present disclosure.

The invention claimed is:

1. A medium-high voltage photovoltaic (PV) power generation system, comprising:
   a three-phase filter; and
   three phase circuits connected in a star manner or a delta manner via the three-phase filter, wherein
   each of the three phase circuits comprises one bridge arm or two bridge arms connected in series, each of the one bridge arm or the two bridge arms comprises one or more cascade modules, one or more PV strings and one or more insulators, each of the one or more PV strings comprises a plurality of PV panels, and in the bridge arm:
      alternating ends of the one or more cascade modules are cascaded to form a branch, and two ends of the branch serve as output ends of the bridge arm;
      a direct current end of each of the one or more cascade modules is connected to at least one of the PV strings;
      the PV string is insulated from a ground via one insulator;
      a height from each of the PV panels to the ground is greater than a preset height; and
      the insulator is of a medium-high voltage withstanding level.

2. The medium-high voltage PV power generation system according to claim 1, wherein
   at least two PV panels of the PV string are insulated from the ground via one insulator; or
   each of the PV panels of the PV string is insulated from the ground via one or more insulators corresponding to the PV panel.

3. The medium-high voltage PV power generation system according to claim 1, wherein the bridge arm further comprises at least one bracket, and wherein
   each of the at least one bracket is arranged between one or more PV panels and the insulator, or
   each of the at least one bracket is arranged between one or more insulators and the ground.

4. The medium-high voltage PV power generation system according to claim 2, wherein the bridge arm further comprises at least one bracket, and wherein
   each of the at least one bracket is arranged between one or more PV panels and the insulator, or each of the at least one bracket is arranged between one or more insulators and the ground.

5. The medium-high voltage PV power generation system according to claim 1, wherein each of the one or more cascade modules is configured to perform a maximum power point tracking (MPPT) control.

6. The medium-high voltage PV power generation system according claim 1, wherein the bridge arm further comprises a plurality of combiner boxes, the direct current end of each of the one or more cascade modules is connected to an output end of at least one of the combiner boxes, and an input end of each of the combiner boxes is connected to at least one of the PV strings.

7. The medium-high voltage PV power generation system according to claim 6, wherein the bridge arm further comprises a plurality of insulators, each of the insulators is configured to insulate at least one of the combiner boxes connected to the insulator from the ground.

8. The medium-high voltage PV power generation system according claim 1, wherein the bridge arm further comprises a lightning protection line arranged around the PV panel, and the lightning protection line is provided with at least one grounding point.

9. The medium-high voltage PV power generation system according to claim 1, wherein the PV string comprises a plurality of substrings connected in series, and adjacent substrings of the plurality of substrings are connected via a switch, and each of the substrings comprises a plurality of PV panels.

10. The medium-high voltage PV power generation system according to claim 1, wherein in a case that each of three phase circuits comprises one bridge arm, the output end of the bridge arm serves as an output end of the phase circuit, and is connected to the three-phase filter; and in a case that each of the three phase circuits comprises two bridge arms connected in series, the two bridge arms serve as an upper bridge arm and a lower bridge arm of the phase circuit respectively, and wherein the upper bridge arm and the lower bridge arm are connected via two first inductors, a connection point of the two first inductors serves as an output end of the phase circuit, and is connected to the three-phase filter; or the upper bridge arm and the lower bridge arm are connected via a second inductor with a center tap, the center tap of the second inductor serves as an output end of the phase circuit and is connected to the three-phase filter.

11. The medium-high voltage PV power generation system according to claim 10, wherein in a case that each of the three phase circuits comprises one bridge arm, a main circuit of each of the one or more cascade modules has an H bridge topology or an H bridge topology with a non-isolated direct current/direct current (DC/DC) converter; and in a case that each of the three phase circuits comprises two bridge arms connected in series, the main circuit of each of the one or more cascade modules has any one of an H bridge topology, an H bridge topology with a non-isolated DC/DC converter, a half bridge topology and a half bridge topology with a non-isolated DC/DC converter.

* * * * *